Figure 1A:
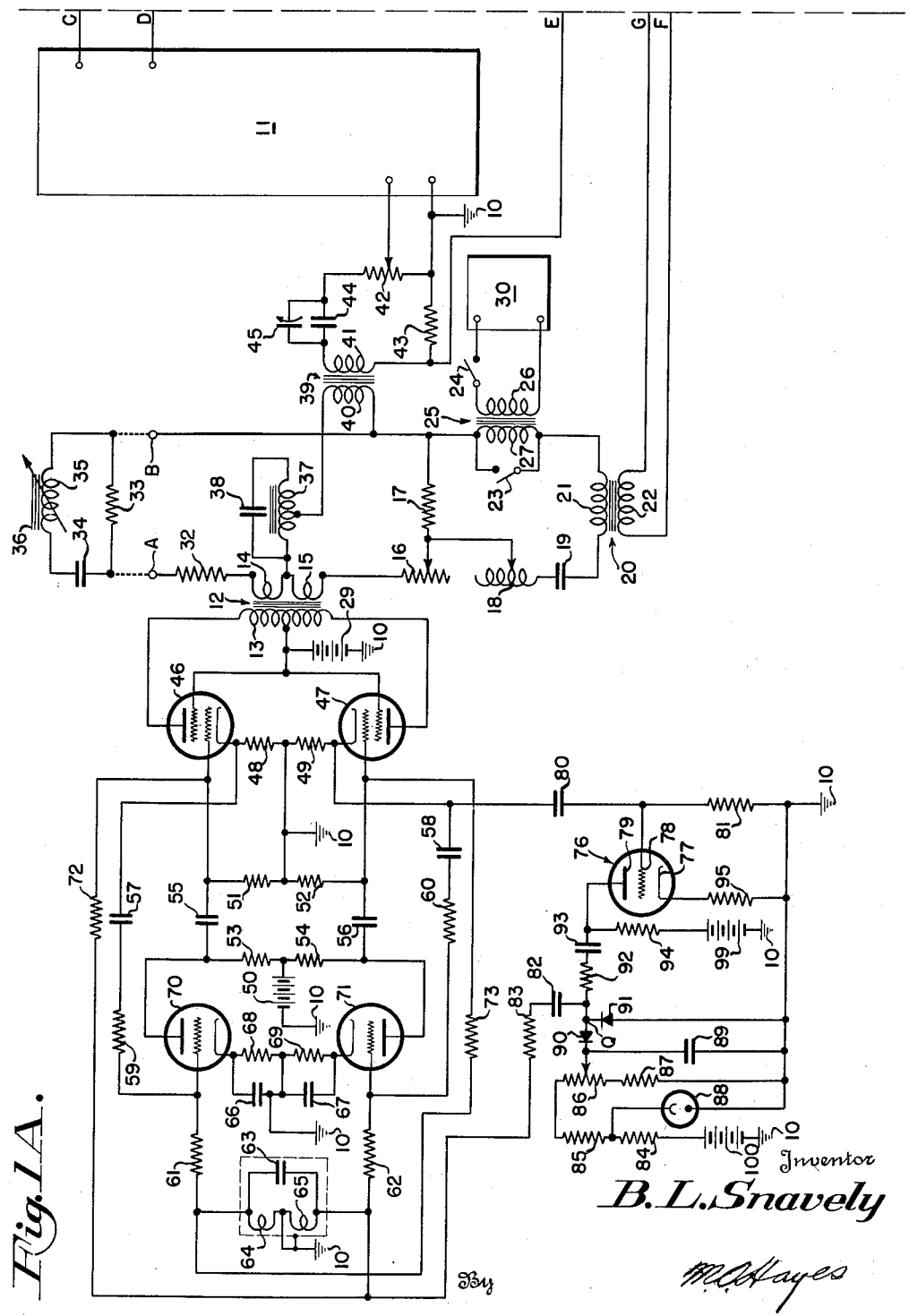

April 10, 1962 B. L. SNAVELY 3,028,757
ELECTRICAL BRIDGE MEASURING APPARATUS
Filed March 3, 1948 3 Sheets-Sheet 1

Inventor
B. L. Snavely
By M. C. Hayes
Attorney

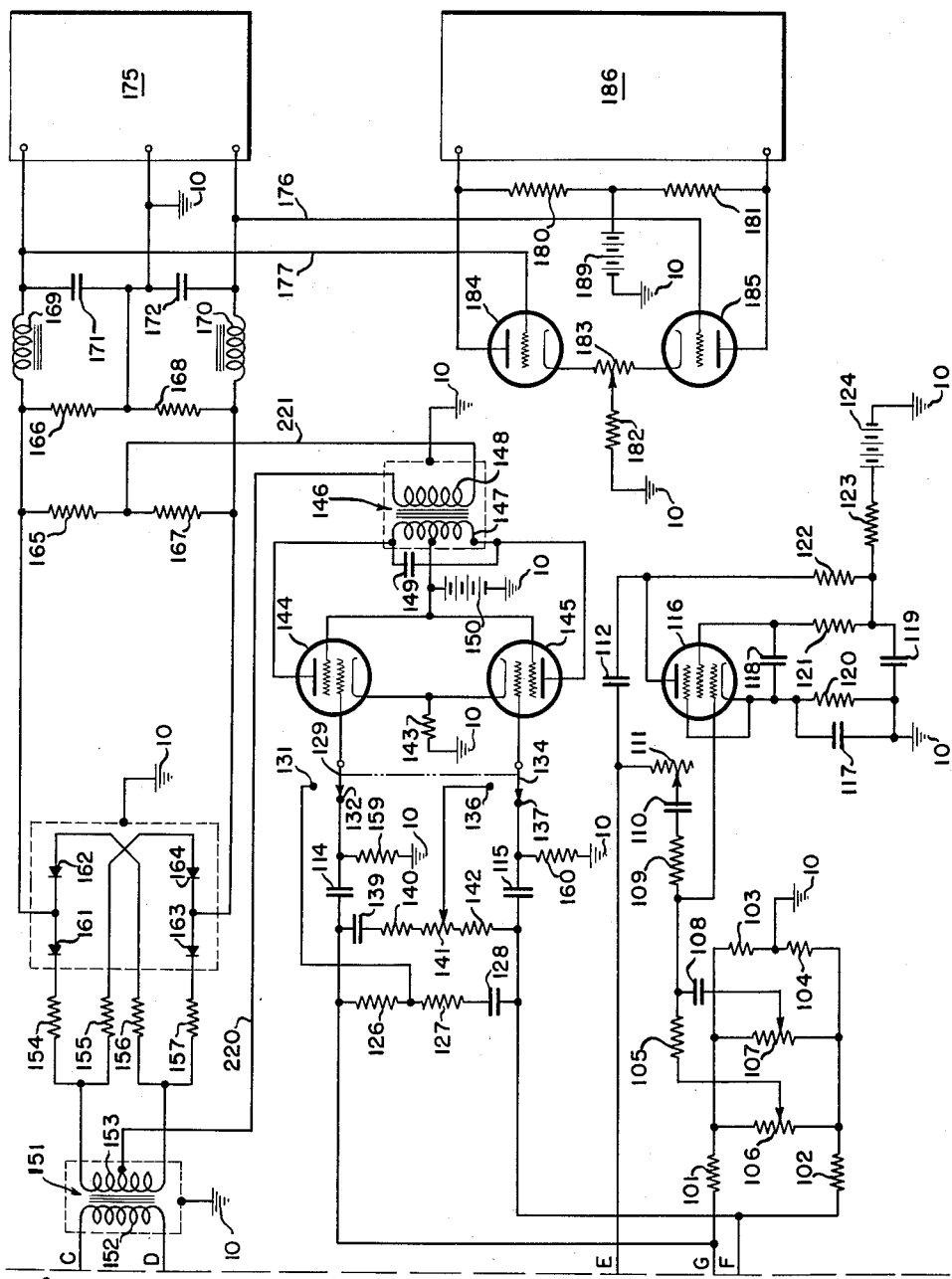

April 10, 1962 B. L. SNAVELY 3,028,757
ELECTRICAL BRIDGE MEASURING APPARATUS
Filed March 3, 1948 3 Sheets-Sheet 3

Inventor
B. L. Snavely

United States Patent Office 3,028,757
Patented Apr. 10, 1962

3,028,757
ELECTRICAL BRIDGE MEASURING APPARATUS
Benjamin L. Snavely, 1314 Erskine St., Takoma Park, Md.
Filed Mar. 3, 1948, Ser. No. 12,843
29 Claims. (Cl. 73—393)
(Granted under Title 35, U.S. Code (1952), sec. 266)

This invention relates to electrical measuring apparatus, and more particularly to electrical bridge apparatus especially suitable for measuring hydrostatic pressures which vary at frequency rates corresponding to frequencies between 0 and 100 cycles per second.

Prior art devices for measuring hydrostatic pressures which vary at rates ranging from low acoustic frequencies such for example, as frequencies in the order of 100 cycles per second to frequencies of zero cycles per second, have several disadvantages. Pressure variations upon the cable which connects the signal transducer to the bridge or other measuring circuit result in spurious signals or random unbalancing of the bridge. In prior art electrical bridge measuring apparatus in which the reactive and resistive balances are not independently indicated, variations in the inductance of the transducer in response to fluctuating hydrostatic pressures thereon have made it difficult to obtain a balance of the bridge. Variations in the frequency and amplitude of the voltage generated by the oscillator which supplies the bridge result in irregularities in the bridge output.

The apparatus of the instant invention possesses all the advantages of the prior art devices and overcomes the foregoing and other disadvantages. A low impedance signal transducer circuit is employed which increases greatly the length of cable which may be employed to connect the pressure sensitive signal generator or transducer to the signal bridge, and also results in reduction of noise introduced into the electrical circuit by external mechanical forces acting on the cable. The instant apparatus also has means associated therewith for suppressing voltages of harmonic frequencies; means is provided for independently balancing the bridge with respect to resistive and reactive components, thereby to facilitate proper balancing in a minimum of time and with a minimum of effort; and an oscillator of high frequency and amplitude stability is provided which results in greater stability of operation for the entire bridge electrical measuring system.

In accordance with the preferred embodiment of the invention, a signal bridge is provided having a stable oscillator coupled thereto for exciting the bridge, and having a pressure sensitive signal generator or transducer comprising a variable inductor element connected by suitable cable means in one of the arms of the bridge, with variable inductor means and variable resistor means connected in another of the bridge arms for coarsely balancing the bridge. Circuit means is provided for obtaining a voltage of adjustable phase and amplitude and mixing this voltage with the output voltage of the bridge to cancel out remaining components of bridge unbalance voltage thereby to simulate a precise balance condition in the bridge and provide a useful output voltage having a component substantially representative of the signal generated by the signal generator in response to changes in pressure applied thereto. Means is also provided to facilitate balance of the bridge by providing a circuit in which the resistive and reactive components of the bridge are separately and independently balanced. A demodulator excited by the bridge output voltage provides a voltage proportional to the voltage produced by the signal generator and which is applied to two indicating devices, one of which is responsive to the low frequency signal voltage and adapted to measure low frequency pressure variations, and the other is responsive to very slow voltage variations and adapted to measure pressure variations applied to the signal generator which are in the region of zero cycles per second.

The apparatus of the instant invention is particularly well adapted for the detection and location of submarines.

One of the objects of the invention is to provide new and improved electrical measuring apparatus especially suitable for measuring periodically fluctuating hydrostatic pressures.

Another object resides in the provision of bridge electrical measuring apparatus having new and improved means associated therewith for separately and independently balancing the bridge with respect to the reactive and resistive components thereof.

Another object resides in the provision of a new and improved oscillator characterized by high frequency and amplitude stability and especially suitable for use with electrical bridge measuring apparatus.

Another object resides in the provision of new and improved bridge electrical measuring apparatus having means associated therewith for separately indicating the balance condition of the bridge with respect to resistance and reactance values.

Another object resides in the provision of new and improved bridge electrical measuring apparatus having a signal generator or transducer connected in one of the arms thereof, the apparatus being adapted to supply a bridge output voltage having a component corresponding to the signal irrespective of the balance condition of the bridge.

Another object resides in the provision of new and improved bridge electrical measuring apparatus having a signal generator connected in one of the arms thereof and demodulator means connected to receive the output of the bridge and to supply to suitable indicating means a demodulator output voltage proportional to the signal generated.

Another object resides in the provision of new and improved phase shifting circuits suitable for bridge balancing.

Still another object resides in the provision of new and improved electrical bridge measuring apparatus employing a signal transducer in one of the arms thereof and having separate indicating means responsive respectively to the low frequency signals generated by the transducer and the signals generated by the transducer which are near zero frequency.

A further object resides in the provision of a new and improved voltage mixing circuit for use with electrical bridge measuring apparatus.

Still a further object resides in the provision of a new and improved calibrating circuit for bridge electrical measuring apparatus.

Figure 2:
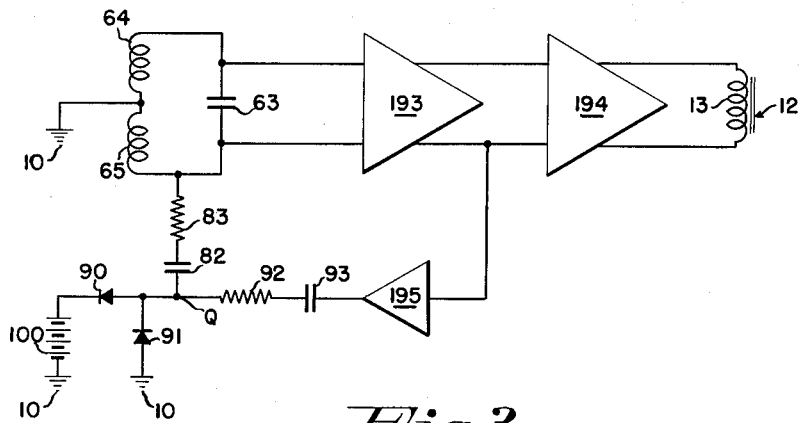
Figure 3:
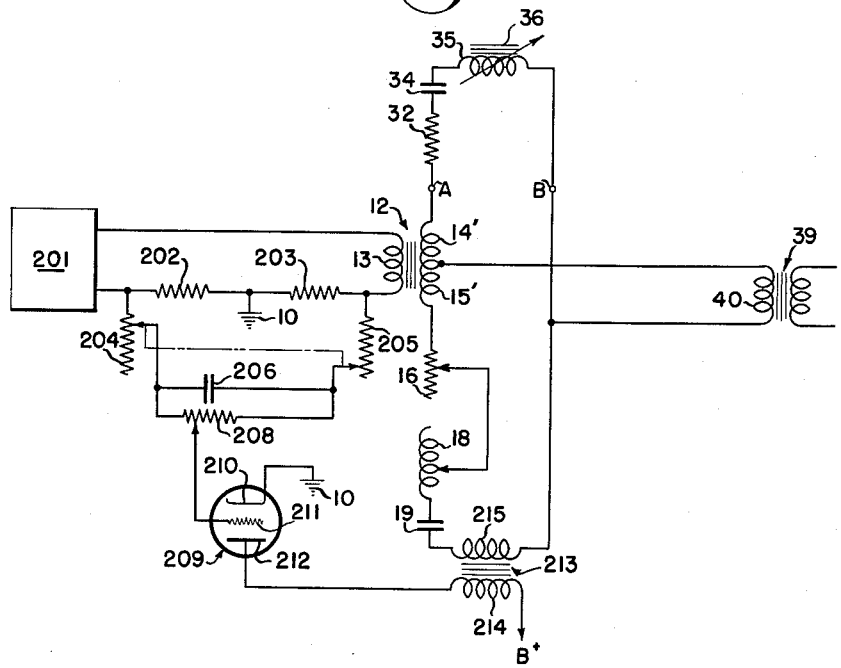

Other objects and advantages not specifically set forth hereinbefore will be apparent from the following specification, taken in connection with the accompanying drawings, in which:

FIGS. 1A and 1B taken together are a diagram of a complete electrical system according to the preferred embodiment of the invention;

FIG. 2 is a simplified circuit diagram of the preferred oscillator circuit for driving the signal bridge of FIG. 1A; and FIG. 3 is a modification of a portion of the circuit of FIGS. 1A–1B showing a different manner of obtaining a voltage of adjustable phase and magnitude for cancelling out components of bridge output voltage resulting from bridge unbalance.

Referring now to the drawings for a more complete understanding of the invention, and in particular to FIG. 1A thereof, there is shown thereon a signal bridge having an input transformer generally designated by the reference numeral 12, and having two similar or balanced secondary windings 14 and 15 which are connected in two arms respectively of the bridge in a manner to be subsequently described more fully, and having a center tapped primary winding 13.

The primary 13 is excited by the output of a stabilized oscillator comprising electron discharge tubes 70, 71, 46, 47, and 76 and associated components.

The frequency controlling L–C circuit of the aforementioned oscillator includes a center tapped inductor comprising inductances 64 and 65 connected together in series, and having the junction therebetween grounded at 10. Connected across the two inductors 64 and 65 is a tuning capacitor 63, one terminal of capacitor 63 being connected by way of resistor 61 to the control grid of oscillator tube 70, which may be a triode of any convenient type. The other terminal of capacitor 63 is connected by way of resistor 62 to the control grid of tube 71, which may be a triode of a type similar to tube 70.

The cathode of tube 70 is connected through resistor 68 to ground, resistor 68 having capacitor 66 connected in parallel therewith, and the cathode of tube 71 is connected through resistor 69 to ground, resistor 69 having capacitor 67 connected in parallel therewith.

The anodes of tubes 70 and 71 are connected to load resistors 53 and 54 respectively, which have the other ends thereof connected together and to the positive terminal of a battery 50, which has the negative terminal thereof connected to ground.

The anode of tubing 70 is connected by way of coupling capacitor 55 to the control grid of electron discharge tube 46, which may be of any convenient type, in the embodiment shown and described herein a tetrode. Similarly, the anode of tube 71 is connected by way of coupling capacitor 56 to the control grid of tube 47, which is preferably of a type similar to tube 46. The control grids of tubes 46 and 47 are connected to ground through resistors 51 and 52 respectively, and the cathodes of tubes 46 and 47 are connected to ground through resistors 48 and 49 respectively. The cathode of tube 46 is further connected through capacitor 57 in series with resistor 59 to the grid of tube 70, and the cathode of tube 47 is connected through capacitor 58 in series with resistor 60 to the control grid of tube 71.

The control grid of tube 46 is connected by way of resistor 72 to inductor 65, while the control grid of tube 47 is connected by way of resistor 73 to inductor 64.

The screen grids of tubes 46 and 47 are connected together and to the positive terminal of battery 29 which has the negative terminal thereof grounded at 10. The anode of tube 46 is connected to one end of primary 13, while the other end of primary 13 is connected to the anode of tube 47. The center tap of the primary 13 is connected to the aforementioned positive terminal of battery 29.

A regulator channel is provided, including tube 76, which may be a triode of any convenient type, having the control grid 78 thereof connected by way of capacitor 80 to the cathode of tube 47, the control grid 78 also being connected by way of resistor 81 to ground 10.

The cathode 77 of tube 76 is connected by way of resistor 95 to ground. The anode 79 of tube 76 is connected by way of resistor 94 to the positive terminal of battery 99 which has the negative terminal thereof connected to ground. Anode 79 is further connected by way of capacitor 93, resistor 92, capacitor 82, and resistor 83, connected in series in the order named, to inductor 65. The junction between resistor 92 and capacitor 82 is connected to a pair of rectifiers 90 and 91. The other terminal of rectifier 91 is connected to ground 10, and the other terminal of rectifier 90 is connected by way of capacitor 89 to ground 10.

The junction between capacitor 89 and rectifier 90 is connected to the arm of a potentiometer 86 which has one terminal thereof connected by way of resistor 87 to ground, and which has the other terminal thereof connected to one end of resistor 85, the other end of resistor 85 being connected to one terminal of gaseous discharge tube 88, the other terminal of the gaseous discharge tube 88 being connected to ground. The junction between resistor 85 and tube 88 is connected by way of resistor 84 to the positive terminal of battery 100, the other terminal of the battery 100 connected to ground at 10.

The operation of the above traced oscillator circuit may best be understood by reference to FIG. 2, in which is shown a simplified diagram thereof, the amplifier stage 193 thereof comprising tubes 70 and 71 of FIG. 1A, the amplifier stage 194 thereof comprising tubes 46 and 47 of FIG. 1A, and the amplifier stage 195 including tube 76 of FIG. 1A.

The oscillator of FIG. 2 comprises a frequency selective network including inductors 64 and 65 and capacitor 63, which is connected to the amplifier 193 which is preferably designed to be substantially linear in its amplifying characteristics. The output of amplifier 193 is fed to two amplifiers, the buffer amplifier 194 which feeds the primary 13 of bridge transformer 12, and a feedback amplifier 195. Both amplifiers 193 and 194 are stabilized by inverse feedback, in a manner to be subsequently more fully described in connection with FIG. 1A. The output of amplifier 195 is connected by way of aforementioned capacitor 93, resistor 92, capacitor 82, and resistor 83, to the frequency controlling network. Capacitors 82 and 93 are blocking capacitors which isolate the D.-C. potentials in the various parts of the circuit. Their capacitative reactances are preferably small compared to the impedances of the circuits in which they operate.

The junction Q between resistor 92 and capacitor 82 is connected to ground through rectifier 91 and also to ground through rectifier 90 and battery 100, the impedance of which is preferably small. The rectifiers, which may be of the copper oxide or any other convenient type, conduct current unidirectionally, for example, in the direction indicated by the arrows of the rectifiers. Battery 100 is of a polarity to oppose the flow of current in this direction.

In the operation of the circuit of FIG. 2, if the potential of point Q rises above the potential of battery 100, current flows through rectifier 90 and battery 100 to ground, while if the potential at point Q falls below ground potential, current flows through rectifier 91. The impedances presented to point Q by resistor 92 in series with the output impedance of amplifier 195, and the impedance presented to point Q by resistor 83 in series with the tuned circuit 63–65, are made high by choice of component values, and as a result, the rectifiers 90 and 91 effectively limit the extreme potentials at point Q. After the signal in the feedback channel attains a predetermined level, a further increase in the signal supplied to amplifier 195 produces slight, if any, additional excitation of the tuned circuit. Accordingly, the tuned circuit is excited at substantially a constant level. As the shape of the voltage variation at Q approaches a square wave, the excitation of amplifier 193 becomes more nearly constant.

Referring again to FIG. 1A, some additional refinements over the circuit arrangement of FIG. 2 are provided. The network of resistors 84, 85, 87, and potentiometer 86 permits adjustment of the operating voltage at point Q of the circuit, while the gaseous discharge tube 88 provides additional voltage regulation for the point at which it is connected. Also, it is noted that cathode resistors 48 and 49 are unbypassed to provide some degeneration and stabilization, and that inverse feedback is provided by the aforementioned lead connection including capacitor 57 and resistor 59 between the cathode of tube 46 and control grid of tube 70, and the lead connection including capacitor 58 and resistor 60 between the cathode of tube 47 and the control grid of tube 71. Cathode resistor 49 also provides coupling for securing a voltage for application to tube 76, and the use of the unbypassed cathode resistors 48 and 49 result in a high impedance presented to primary 13, with resultant increase in the stability and sensitivity of operation of the bridge. By properly proportioning the resistors 72 and 73 with respect to resistors 51 and 52 respectively, the output of the oscillator may be made nearly independent of the heater voltages applied to the tubes 70, 71, 46, and 47.

The aforementioned oscillator circuit, accordingly, constitutes an oscillator having the characteristics of high frequency and amplitude stability, for energizing the signal bridge. Any suitable frequency may be employed for the excitation of the bridge; in the embodiment herein described, the oscillator preferably supplies a voltage of a frequency of 1000 c.p.s.

The aforementioned signal bridge has connected in circuit therein a pair of terminals A and B, to which is connected as by a length of suitable cable, the signal transducer or signal generator comprising variable inductor 35 having core 36. Resistor 32 is connected between the aforementioned secondary 14 and terminal A. Capacitor 34 is connected in series with inductor 35 at the transducer end of the cable, and resistor 33 is connected in parallel with the L–C combination 34—35 at the transducer. One end of the aforementioned secondary 14 is connected to terminal A by way of resistor 32. The inductor 35 and core 36 comprise a signal transducer or generator having means, not shown, adapted to vary the inductance thereof in response to changes in pressure applied thereto. As will be subsequently described more fully, the unbalance of the bridge caused by the varying inductance results in a bridge output voltage having a modulation component corresponding to the pressure variations. The transducer comprising elements 35—36 may be a transducer similar to that described and claimed in my copending application for Transducer, Elements Therefor and Method of Assembly, Serial No. 103,501, filed July 7, 1949, now Patent No. 2,745,083.

Input terminal B is connected to one end of the primary 40 of bridge output transformer 39, the other end of primary 40 being connected to the center tap of an inductor 37 which has connected across the full winding thereof a capacitor 38, one end of the winding of inductor 37 being connected to the junction between secondaries 14 and 15.

The inductor 37 and capacitor 38 form a resonant circuit tuned to reject the third harmonic of the operating frequency, which frequency is, in the preferred embodiment, 1000 c.p.s. The iron or other magnetic material employed in the various elements of the bridge circuit may introduce a considerable amount of this third harmonic which may overload a bridge output amplifier and demodulator hereafter to be described. Accordingly the filter 37—38 is provided. Capacitors 44 and 45 connected to the secondary 41 of the bridge output transformer and hereafter to be more fully described, neutralize or correct the phase shift introduced at the operating frequency by the aforementioned third harmonic filter.

Terminal B is also connected to one end of the secondary 27 of a calibration transformer generally designated by the reference numeral 25 and including a primary 26 having connected thereto by way of switch 24 a source of potential of adjustable frequency and amplitude, shown in block form at 30, for injecting a calibrating voltage into the bridge circuit, secondary 27 having connected in shunt therewith a single pole, single throw switch 23 for selectively short circuiting the secondary 27 for purposes to be hereinafter described. From secondary 27 a lead connection goes to the primary 21 of a transformer generally designated by the reference numeral 20, the other end of the primary 21 being connected by way of capacitor 19, variable inductor 18, and variable resistor 16, connected in series in the order named, to the end of secondary 15. A resistor 17 is connected from the arm of variable resistor 16 to terminal B, completing the bridge circuit. It should be noted that two of the arms of the bridge comprise secondaries 14 and 15, one of the remaining arms including, in series, resistor 32, capacitor 34, and the variable inductance 35 of the signal generator, the capacitor and variable inductance having connected in shunt thereacross the aforementioned resistor 33, the fourth arm of the bridge including variable resistor 16, variable inductor 18, capacitor 19, primary 21, secondary 27 (switch 23 is normally open when the apparatus is in operation), and the shunt resistor 17. Variable inductor 18 and variable resistor 16 may be tapped if desired. Capacitor 19 is preferably of the same value of capacitance as capacitor 34.

Secondaries 14 and 15 are balanced, and it is apparent that the bridge may be balanced by adjusting the reactive and resistive elements of the two remaining arms to equality, variable resistor 16 being adjusted in a manner corresponding to the resistance of the length of cable which connects the signal transducer 35—36 to terminals A and B, and variable inductor 18 being adjusted to balance the inductance of the transducer and the inductance of the connecting cable. Means hereinafter to be described is provided for simulating precise balance conditions in the bridge.

The output voltage from secondary 41 is developed across a circuit including, in series, the aforementioned phase correction capacitor 44 paralleled by variable capacitor 45, potentiometer 42, and resistor 43, the junction between potentiometer 42 and resistor 43 being connected to ground at 10. A portion of the voltage developed across potentiometer 42, as determined by the setting of the variable contact arm thereof, is applied to the input of an amplifier 11, which may be a vacuum tube amplifier of conventional design, the potentiometer 42 serving as a gain control therefor. A lead connection E is connected to the junction between secondary 41 and resistor 43, for applying a voltage to the circuit, for purposes to be hereafter described.

Referring now particularly to FIG. 1B, it is noted that the output of amplifier 11 is applied by way of leads C—D to the primary 152 of a transformer generally designated by the reference numeral 151, and having a center tapped secondary 153.

The voltage developed in secondary 153 is applied to a ring demodulator or detector, which includes the four rectifier elements 161, 162, 163, and 164 which are preferably similar and may be of any desired type, for example, copper oxide. One end of secondary 153 is connected to the ends of a pair of similar resistors 154 and 155, the other end of resistor 154 being connected to rectifier 161 and the other end of resistor 155 being connected to rectifier 164. The other end of secondary 153 is connected to the ends of a pair of additional similar resistors 156 and 157, the other end of resistor 156 being connected to the rectifier 162, the other end of resistor 157 being connected to rectifier 163. Rectifiers 161 and 162 are connected together, and rectifiers 163 and 164 are connected together. The junction between rectifiers 161 and 162 is connected by way of resistors 165 and 167 to the junction between rectifiers 163 and 164. Lead connection 220 is connected to the center tap of secondary 153, and lead connection 221 is connected to the junction between resistors 165 and 167.

The operation of the ring modulator is well known in the art, the principle of operation thereof in another application having been described in an article entitled "Copper Oxide Modulators in Carrier Telephone Systems," by R. S. Caruthers, Bell System Techical Journal, April 1939. If a voltage of the same frequency as the bridge excitation voltage is applied across leads 220—221, the voltage output of the demodulator is proportional to the magnitude of the voltage output of amplifier 11, and is a function of the phase angle between the voltage applied to the demodulator from secondary 153, and the voltage applied to the demodulator by way of leads 220—221.

The voltage applied to the ring demodulator from secondary 153 may comprise a voltage resulting from reactive unbalance of the bridge, or a voltage resulting from resistive unbalance of the bridge which will be 90 degrees out of phase with the reactive voltage, or may comprise a voltage containing both resistive and reactive components having a phase angle of less than 90 degrees with each of the aforementioned reactive and resistive voltages.

The manner in which the desired voltage is developed across leads 220 and 221 for application to the demodulator will be more clearly apparent as the description proceeds, it being sufficient to state here that a voltage is obtained and applied to these leads 220 and 221 which is either substantially in phase with (or 180 degrees out of phase with) the aforementioned reactive voltage of 153, or in phase with the resistive voltage of 153 (or 180 degrees out of phase).

The oscillator frequency of 1000 c.p.s. is eliminated in the demodulator, and the demodulator output voltage developed across the series-resistor combination 165—167 has a direct current component which, when the voltage across leads 220—221 is in phase with the reactive voltage at secondary 153, is substantially porportional to the reactive unbalance of the bridge. When the voltage across leads 220—221 is in phase with the resistive voltage at secondary 153, the D.-C. component of the demodulator output is substantially proportional to the resistive unbalance of the bridge.

Across resistors 165 and 167 are also connected a pair of resistors 166 and 168 connected in series. The junction between resistors 166 and 168 is connected to ground at 10 and to the center terminal of 175, which may be either a push pull amplifier or other device of conventional design, and is suitable or amplifying, recording, or analyzing voltages of the frequency range 1 to 100 c.p.s.

The junction between resistors 165 and 166 is connected to one end of an inductor 169, which has the other end connected to capacitor 171 and to one input terminal of indicator 175. The capacitor 171 is also connected to ground 10. The junction between resistors 167 and 168 is connected to one end of inductor 170, the other end of inductor 170 being connected to the third terminal of indicator 175 and to capacitor 172, which is also connected to ground at 10.

The inductors 169 and 170 and the capacitors 171 and 172 comprise a low pass filter which by suitable choice of component values is arranged to pass frequencies corresponding to the fluctuations of pressures impressed on the signal generator or transducer 35—36, but which rejects frequencies corresponding to the oscillator frequency and its harmonics The signal frequency appearing across the upper and lower terminals of 175, FIG. 1B, is within the limitations imposed by the upper cut-off frequency of the system, an accurate counterpart of the varying pressure applied to the diaphragm of the pressure sensitive unit.

An additional indicating circuit is provided for recording that portion of the output of the aforementioned demodulator which is in the region of zero cycles per second, and comprises electron discharge tubes 184 and 185 and a recording milliammeter 186. The upper terminal, FIG. 1B, of indicator 175 is connected by way of lead 177 to the control grid of tube 184, which may be a triode of conventional design. The lower terminal of 175, FIG. 1B, is connected by way of lead 176 to the control grid of tube 185, which may be a triode similar to tube 184. The cathodes of tubes 184 and 185 are connected to the ends of a balancing potentiometer 183, which has the moving arm thereof connected to one end of a biasing resistor 182, the other end of the resistor being connected to ground 10. Tube 184 has the anode thereof connected by way of resistor 180 to the positive terminal of a source of potential 189, the negative terminal of 189 being connected to ground 10. The anode of tube 185 is connected by way of resistor 181 to the positive terminal of battery 189, and the anode of tube 185 is also connected to one terminal of a recording milliammeter 186. The anode of tube 184 is connected to the other terminal of recorder 186.

Referring again particularly to FIG. 1A, the aforementioned transformer 20 having the primary 21 connected in the bridge circuit, has leads G and F connected to the ends of the secondary 22. Leads G and F apply the voltage developed by the secondary to a phase shifting circuit.

The phase shifting circuit, FIG. 1B, includes two parallel arms or branches connected across leads G and F. One arm includes, in series, resistor 126, resistor 127, and capacitor 128. The other arm includes capacitor 139, resistor 140, potentiometer 141, and resistor 142. Lead G is connected also to one terminal of capacitor 114, which has the other terminal thereof connected by way of resistor 159 to ground 10 and also connected to terminal 132 of a single pole, double throw switch having an additional terminal 131 connected to the junction between resistor 126 and resistor 127, the switch also having an arm 129 connected to the control grid of an electron discharge tube 144, which may be a tetrode of conventional design.

Lead F is also connected to one terminal of a capacitor 115, which has the other end thereof connected by way of resistor 160 to ground 10, the capacitor being also connected to a terminal 137 of a single pole, double throw switch, having the other terminal 136 thereof connected to the arm of potentiometer 141, and having the switch arm 134 ganged to switch arm 129 and electrically connected to the control grid of electron discharge tube 145, which is preferably a tube of a type similar to tube 144. The cathodes of tubes 144 and 145 are connected together, and to one end of a biasing resistor 143 which has the other end thereof connected to ground 10. The anode of tube 144 is connected to one end of the center tapped primary 147 of a transformer generally designated by the reference numeral 146, and having the other end of the primary connected to the anode of tube 145. The primary 147 has connected thereacross a capacitor 149, and the center tap of the primary is connected to the screen grids of both tubes 144 and 145 and to the positive terminal of a source of potential 150 which has the negative terminal thereof connected to ground. The secondary 148 of transformer 146 is connected by a forementioned leads 220 and 221 to the aforementioned ring demodulator.

In the operation of the aforedescribed phase shifting circuit, it is noted that the voltages across leads G and F are 180 degrees out of phase with reference to ground. When switch 129 is on terminal 132, the voltage at the control grid of tube 144 lags the voltage on lead G by 45 degrees. When switch 134 is on terminal 137, the voltage on the grid of tube 145 lags the voltage on lead F by 45 degrees. The voltages on the grids are 180 degrees out of phase with each other and lag the voltage across leads G and F by 45 degrees. When switch 129 is on terminal 131, the voltage at the control grid of tube 144 leads the voltage on lead G by 45 degrees, and when switch 134 is on terminal 136, the voltage on the control grid of tube 145 leads the voltage on lead F by 45 degrees. Accordingly when the switches are in their last-named positions, the voltage between the grids leads the voltage between leads G and F by 45 degrees. Switches 129 and 134 accordingly switch the grid voltages by 90 degrees between their two positions.

The circuit is designed, by suitable choice of component values, to provide a condition in which the voltage across leads G and F has substantially a 45 degree phase angle with respect to the current in primary 21. This condition may be provided for by proportioning the load presented to the secondary by resistors 106, 107, 103, 104, and the arms of the phase shifting network with respect to the reactance of secondary 22. As a result of the foregoing circuit arrangement, the total phase shift introduced by the network is either substantially 90 degrees or 0.0 degrees, depending upon whether the switches 129 and 134 are positioned so shifts introduced by the resistance-capacitance combinations respectively add or annul each other.

An additional phase shifting circuit is provided, for securing a voltage of adjustable phase and magnitude with respect to the driving or exciting voltage in the bridge, for cancelling out in the mixing resistor 43, the component of bridge output voltage resulting from unbalance conditions in the bridge.

This additional phase shifting circuit comprises the electron discharge tube 116 and associated components. A resistor network is connected to leads G and F to receive a voltage from the secondary 22 of transformer 20. Three parallel branches comprising potentiometer 106, potentiometer 107, and resistors 103 and 104 connected in series, are connected by way of resistors 101 and 102 to leads G and F. The junction between resistors 103 and 104 is connected to ground. The movable arm of potentiometer 106 is connected by way of fixed resistor 105 to the control grid of an electron discharge tube 116, which may be a pentode of conventional design, and the movable arm of potentiometer 107 is connected by way of capacitor 108 to the control grid of tube 116. The control grid is further connected to a resistor 109, the other end of resistor 109 being connected to one terminal of a fixed capacitor 110, the other terminal of capacitor 110 being connected to a variable resistor, the variable resistor being connected to the aforementioned lead E, the variable resistor and lead E being connected by way of capacitor 112 to the anode of electron discharge tube 116. The anode of tube 116 is further connected by way of resistors 122 and 123 to the positive terminal of a source of anode potential 124, the negative terminal of the source of anode potential 124 being connected to ground 10.

The cathode of tube 116 is connected by way of biasing resistor 120 to ground, the biasing resistor 120 having connected in parallel therewith the bypass capacitor 117. The screen grid of tube 116 is connected by way of capacitor 118 to the cathode, and by way of resistor 121 to the junction between resistors 122 and 123, to receive a screen potential from the source 124, the junction between resistors 122 and 123 also being connected by way of decoupling capacitor 119 to ground 10.

In the aforedescribed circuit, the total resistances of potentiometers 106 and 107 respectively, and the resistances of the two equal resistors 103 and 104, are small compared to the resistance of 105. The values of these resistors are so arranged, and transformer 20 is so designed, that the voltages appearing across potentiometers 106 and 107 are substantially 45 degrees out of phase with the current flowing in the bridge. The capacity of the condenser 108 is selected so that its reactance at the operating frequency of the system is approximately equal to the resistance of 105. Under these conditions the voltage appearing across the grid of tube 116 with respect to ground will be zero when potentiometers 106 and 107 are in their center positions. Neglecting for purposes of description the effect of the feedback circuit including resistors 109 and 111 and capacitor 110, the voltage appearing across the grid of tube 116 when the arm of potentiometer 107 is moved from its center position will be in quadrature with the bridge current. The amplitude of this voltage will be proportional to the displacement of the arm of potentiometer 106 from its center position, and the phase will lead or lag the bridge current, depending upon the direction of the displacement of the arm of potentiometer 107. Similarly, displacement of the arm of potentiometer 106 from its center position will give rise to a component of voltage across the grid of tube 116 which will be proportional to the displacement of the arm and which will be either in phase or 180 degrees out of phase with the bridge current, depending upon the direction in which the arm is displaced.

The feedback circuit of tube 116 comprising resistors 109 and 111 and capacitor 110 serves to stabilize the gain of tube 116, and provides through the variable resistor 111 an adjustment by which the phase angle of the components introduced by potentiometers 106 and 107 may be varied slightly with respect to the bridge current, suitable choice of component values being made.

As previously stated, the aforedescribed phase shifting circuit of tube 116 is connected by lead E to the junction between resistor 43 and secondary 41. The voltage which appears across resistor 43 as a result of adjustment of potentiometers 106 and 107 consists of two independently adjustable components. One of these components is varied by 106 and the other by 107. The two components are always in quadrature with each other. By means of variable resistor 111 their directions may be adjusted so that the component controlled by potentiometer 107 is either exactly in quadrature with the bridge current or makes a given small angle with such a quadrature phase angle. Thus, the voltage appearing across resistor 43 may be adjusted by potentiometers 106 and 107 so that the voltage will balance any voltage appearing across the secondary 41 after variable resistor 16 and variable inductor 18 in the bridge circuit have been adjusted to a coarse balance of the bridge.

One of the stated objects of the invention is to provide bridge acoustic pressure measuring apparatus in which the effects of spurious signals and harmonics within the bridge circuit is reduced to a negligible amount. Referring again particularly to FIG. 1A, the variable inductor 35 is preferably wound with a few turns. This inductor 35 in combination with the series condenser 34 results in a low impedance transducer unit, of which the component values are so arranged that at the frequency of the alternating current which excites the bridge, the combined impedance of 34 and 35 is a minimum, or near a minimum, value. A low impedance in the transducer unit results in a low electrical potential applied across the cable and thereby reduces the effect of variations in the cable capacity with respect to the production of spurious signals.

The aforedescribed bridge circuit arrangement including resistors 33 and 17 provides a circuit in which the effects of parallel resonance between the cable and the pressure sensitive unit are reduced so that they do not materially affect the operation of the system. The resistor 33 has a resistance which is much higher than the resistance of the series combination of capacitor 34 and inductor 35, which at the operating frequency of the system are substantially in resonance. Accordingly, the resistor 33 and the corresponding resistor 17 in the opposite bridge arm have little effect on the operation of the bridge. However, at harmonics of the operating frequency, at which parallel resonance may occur because of cable capacity, the resistor 33 greatly reduces the impedance presented to the bridge by the cable and the pressure sensitive unit 34—35, thereby reducing the amplitude of the harmonic voltages developed.

The electrical system of the preferred embodiment of FIGS. 1A and 1B has now been traced, and the operation of the apparatus will now be described in greater detail.

The stabilized oscillator, FIG. 1A, comprising electron discharge tubes 70, 71, 46, 47 and 76, supplies to bridge input transformer 12 a substantially sinusoidal voltage of a predetermined desired frequency, for example, 1000 c.p.s. Assume now by way of description that the bridge circuit is complete as shown in the figure, with switches 23 and 24 open, and the transducer 35—36 and associated components connected by a suitable length of cable to terminals A and B, and immersed within a body of water, and having varying hydrostatic pressures of a frequency between 0 and 100 c.p.s. applied thereto. Assume that the bridge is not balanced, as it would normally not be at the beginning of a measuring operation.

For the purpose of describing the operation of the bridge circuit, the application of a pressure increment to the pressure sensitive transducer 35 may be considered as equivalent to the introduction of an alternating E.M.F. in series with the transducer. This E.M.F. has the same frequency as the bridge current which it lags by 90 degrees. The frequency of the varying pressure results in the aforementioned E.M.F. generated in the bridge and a signal resembling an amplitude modulated wave in which the frequency and amplitude of the pressure variations appear in the modulation characteristics of the E.M.F. This latter voltage containing the signal component is applied to the primary 40 of the bridge output transformer 39.

In the construction of the apparatus of the invention, it is preferable to provide an amplifier 11 so constructed that the 1000 cycle E.M.F. generated in the bridge as a result of the varying inductance 35, and the output voltage which secondary 153 applied to the demodulator, are in phase. This is accomplished, as will be readily understood by those skilled in the art, by providing an amplifier and circuit arrangement in which the total phase shifts in the transformers, electron discharge tubes, or other components, add to 360 degrees or some multiple thereof.

As previously stated, the demodulator is designed, in conjunction with the phase shift network comprising electron discharge tubes 144 and 145 and associated components, to permit a circuit arrangement in which the bridge may be separately and independently balanced with respect to reactive and resistive components. The transformer 20 is designed to have a high ratio of reactance to resistance in the windings thereof, and the component values of the phase shifting network comprising the arms 126—127—128 and 139—140—141—142 are so proportioned that the phase of the voltage applied across leads 220—221 is either in phase with the reactive component of voltage across 153 or 90 degrees out of phase with this voltage and in phase with the resistive component of voltage across 153.

Assume now by way of description that it is desired to put the apparatus in operation. Procedure for calibration will be more fully described subsequently. The following steps in adjusting the apparatus for use may conveniently be followed:

(1) With switch 23 in the bridge circuit opened, and switch 24 opened also, the ganged switches 129—134 are thrown to their lower positions, FIG. 1B, and a coarse adjustment for inductance balance made by adjusting the value of the variable inductor 18 in the bridge circuit until the indicator 186 approaches its zero value or mid position. This coarse adjustment is preferably made with the gain of amplifier 11 reduced to a low value.

Switches 129—134 are then thrown to their upper positions as viewed on FIG. 1B, and the resistance of variable resistor 16 adjusted to bring the indication of 186 to its minimum value.

The gain of the amplifier 11 is now increased, and the potentiometer 106 adjusted for a fine resistance balance as indicated by a minimum indication on indicator 186. Switches 129—134 are thrown back to their first or down positions, FIG. 1B, and a fine reactive balance made by adjusting the position of the arm of potentiometer 107.

In the calibration of the apparatus with respect to the low frequency indicator 175, the switches 129—134 are set in their lower positions, FIG. 1B, and the switch 23 is closed. The inductance of secondary 27 is known, and shorting the secondary 27 by closing switch 23 is equivalent to adding a known amount of inductance in the other arm (hydrophone arm) of the bridge. The hydrophone 35 has previously been calibrated in change of inductance per unit pressure applied thereto; accordingly, the change in indication at 175 when the secondary 27 is shorted provides a means for ascertaining the gain of the circuit and determining the absolute magnitude of the pressure variations.

It is desirable before using the apparatus to align the circuits with respect to the phase shifts to secure the desired precise relationships. Alignment consists first in adjusting 111 so that shifting 106 from its center position causes no change in the D.-C. output of the demodulator when 129 and 134 are on 132 and 137 respectively, and second, in adjusting 141 so that when 129 and 134 are on 131 and 136 respectively shifting of 107 from its center position causes no change in D.-C. output of the demodulator. These alignment adjustments are necessitated by the small resistances in the reactive elements of the phase shifting circuits, and the small reactances in the resistance elements thereof.

Reference is made now to FIG. 3, in which is shown another arrangement for securing a voltage of adjustable phase and amplitude for exactly balancing the bridge or cancelling out small resistive or reactive components of unbalance voltage remaining after rough balance adjustments have been made at variable inductor 18 and variable resistor 16.

In FIG. 3, an oscillator, which may be a stable oscillator of any convenient design, is shown in block form at 201, and is connected by way of resistors 202 and 203 to the primary 13 of bridge exciting transformer 12. The junction between resistors 202 and 203 is connected to ground, and the resistors are of equal value, the values being small compared to the total values of variable resistors 204 and 205 which are also equal. The sliding contacts by which 204 and 205 are adjusted are ganged so that the total resistance of the used portions of 204 and 205 will be substantially constant. The reactance of capacitor 206 is small compared to the resistance of 204 and 205. Capacitor 206 is connected in parallel with potentiometer 208, and both are connected between the adjustable arms of resistors 204 and 205. The arm of potentiometer 208 is connected to grid 211 of tube 209. The total resistance 208 is made large, and is much larger than the combined resistance of 204 and 205. Under these conditions, the voltage applied to the grid 211 consists of two components which are separately adjustable in magnitude and which are substantially in quadrature. One of these components is substantially in phase with the current through resistors 202 and 203 and accordingly is substantially in phase with the bridge current. This component is adjusted by the ganged variable resistors 204 and 205. The other component is adjusted by means of resistor 208.

Tube 209, which may be of any convenient type, in the embodiment shown a triode having cathode 210, aforementioned control grid 211, and anode 212, has the cathode thereof connected to ground and has the anode thereof connected to one end of the primary 214 of a transformer generally designated by the reference numeral 213, and having the secondary 215 thereof connected in one arm of the bridge circuit.

In the operation of the circuit of FIG. 3 for balancing the bridge, coarse adjustment of the bridge balance is effected by means of the variable resistor 16 and the variable inductor 18 in the bridge circuit, and final balance by the adjustment of resistors 204 and 205, and of resistor 208.

It is contemplated that the electron discharge tubes of the circuit have any convenient heater means for heating the cathodes thereof, and any suitable energizing means connected to the heaters for energizing the same.

Whereas the invention has been shown and described with reference to a signal transducer having an inductive reactance, it is evident that a transducer having a capacitative reactance could be employed instead, suitable bridge balancing means being provided.

Whereas a bridge circuit employing a variable inductor in one leg which is brought into equality with the inductance in another leg is shown, several other bridge circuits are possible, for example, one in which a variable capacitative reactance is employed with a fixed inductive reactance.

It will be understood, that in the embodiment shown and described herein, the change in the inductance of 35 as the depth of submersion thereof changes, is compensated for by balancing the bridge.

It will be further understood that, whereas separate batteries have been shown as sources of potential for the various circuits, one common source of potential may be employed for several circuits where no undesirable coupling is introduced thereby.

It will be further understood that one of the indicators 175 and 186 may be dispensed with if desired.

It will be further understood that the primary of transformer 20, FIG. 1A, may if desired be connected in series with the primary of transformer 12 instead of in the bridge circuit.

It will also be understood that whereas in some instances the operation of the apparatus has been described with reference to two voltages which are in phase, that in many cases, voltages which are 180 degrees out of phase would also produce the desired results.

Whereas the invention has been described with reference to its application in measuring periodically varying hydrostatic pressures, the invention is not limited to this application.

Whereas the invention has been shown and described with reference to two embodiments thereof which give satisfactory results, it will be evident to those skilled in the art, after understanding the invention, that various changes and modifications may be made without departing from the spirit or scope of the invention, and it is therefore intended, in the appended claims, to include all such changes and modifications.

This invention may be manufactured and used by or for the Government of the United States of America for governmental purposes without the payment of any royalties thereon or therefor.

What is claimed as new and desired to be secured by Letters Patent of the United States is:

1. In apparatus of the character disclosed, in combination, a bridge circuit including a variable inductance element; a source of alternating current potential; means connecting said source of alternating current potential to said bridge circuit for energizing the latter; said inductance element being adapted to produce a signal voltage in response to changes in pressure applied thereto; output indicating means operatively connected to said bridge circuit for indicating the magnitude of the signal voltage produced therein; and means for balancing said bridge circuit in the absence of a signal voltage generated therein, said last-named means including apparatus for obtaining an alternating current potential of adjustable phase and magnitude, and means connected to said bridge circuit for injecting said last-named voltage into said bridge circuit.

2. In apparatus of the character disclosed, in combination, a bridge circuit having an input transformer, an output transformer, an injection transformer adapted when energized to supply a balancing current to the bridge, and a variable inductance element adapted to produce a signal voltage connected in one of the arms of the bridge; variable resistor and variable inductor means connected in said bridge circuit for balancing the circuit in the absence of a signal voltage produced therein; a source of alternating current potential; circuit means connecting said source of alternating current potential to said input transformer to energize the bridge circuit; a network operatively connected to said source of alternating current potential and energized therefrom, said network being adapted to provide an alternating current voltage of adjustable phase and magnitude; means for applying said last-named voltage to said injection transformer; and signal indicating means operatively connected to said output transformer and adapted to indicate the magnitude of the signal voltage produced by said variable inductance element.

3. In apparatus of the character disclosed, in combination, a bridge circuit including an input transformer, voltage generating means connected to said input transformer for energizing the bridge circuit, a variable inductance element adapted to produce a signal voltage and connected in one of the arms of said bridge circuit, variable impedance means connected in another of the arms of said bridge circuit for balancing the bridge in the absence of a signal voltage produced in the bridge, amplifying means connected to said bridge circuit and adapted to have applied thereto the output voltage of the bridge, output voltage rectifying means energized from said amplifying means, variable phase shifting means connected to said bridge circuit and adapted to be energized from said voltage generating means and to apply its output to the bridge network to balance the resistive and the reactive components of said bridge and indicating means energized from said rectifying means, said indicating means being constructed and calibrated to indicate the magnitude of the signal produced by said variable inductance signal generating element.

4. In apparatus of the character disclosed, in combination, a bridge circuit including an input transformer, a source of alternating current potential, circuit means connecting said source of alternating current potential to said input transformer for energizing the bridge circuit, a variable inductance element connected in one of the arms of the bridge circuit and adapted to produce a signal voltage in response to varying pressures applied thereto, means in another of the arms of the bridge circuit for balancing the bridge in the absence of said signal voltage, amplifying means connected to said bridge circuit for amplifying the output voltage thereof, demodulator means connected to said amplifying means and adapted to be energized therefrom, a phase shifting network, said phase shifting network being operatively connected to said source of alternating current potential and adapted to be energized therefrom, said phase shifting network being operatively connected also to said demodulator means and adapted to apply its output to said demodulator means, and indicating means operatively connected to said demodulator means, said demodulator means being constructed and arranged to supply a voltage to said indicating means which is proportional to the cosine of the phase angle between the voltage supplied to said demodulator means from said amplifying means and the voltage supplied to said demodulator means from said phase shifting network.

5. In apparatus of the character disclosed, in combination, a bridge circuit having an input transformer, voltage generating means connected to said input transformer for energizing the birdge circuit, a variable reactor element connected in one of the arms of said bridge circuit and constructed and arranged to produce a signal voltage in response to changes of pressure applied thereto, means in another of the arms of said bridge circuit for balancing the bridge in the absence of said signal voltage, means connected to said bridge circuit for amplifying the output voltage of the bridge, means connected to said amplifying means for demodulating the output voltage of the amplifying means, means operatively connected to said demodulating means for indicating the amplitude of the demodulated output voltage, a variable phase shifting network operatively connected to said source of alternating current potential and energized thereby, said variable phase shifting network being connected also to said demodulating means thereby to supply the output of the phase shifting network to the demodulating means, said variable phase shifting network being adapted to apply two voltages selectively to said demodulating means, one of said two voltages being in phase with the voltage component in the bridge output which corresponds to reactive unbalance of the bridge and the other of said two voltages being in phase with the voltage component in the bridge output which corresponds to resistive unbalance of the bridge.

6. In apparatus of the character disclosed, in combination, a bridge circuit, an input transformer having a primary and a secondary, said secondary being connected in said bridge circuit, said transformer being adapted to energize the bridge circuit, a source of alternating current potential, electrical connections between said source and said primary for energizing the transformer and bridge circuit, a variable impedance element connected in one of the arms of said bridge circuit and adapted to generate a signal voltage in response to changes in pressure applied thereto, means connected in another of the arms of the bridge circuit for balancing the bridge circuit in the absence of said signal voltage, amplifying means operatively connected to said bridge circuit and adapted to have the output voltage of the bridge circuit applied thereto, demodulating means operatively connected to said amplifying means and adapted to have the output of the amplifying means applied thereto, indicating means operatively connected to said demodulating means for indicating the demodulated output voltage thereof, a variable phase shift network electrically connected to said source of alternating current potential and energized thereby, said variable phase shift network being connected to said demodulating means and adapted to supply the output voltage of the network to the demodulating means, said demodulating means being constructed and arranged so that the voltage applied from the demodulating means to said indicating means is proportional to the output of the amplifying means and is a function of the phase angle between the output voltage of the amplifying means and the output voltage of the phase shift network.

7. Apparatus according to claim 6 wherein the demodulating means is further characterized in that the output of the demodulating means applied to the indicating means is a maximum when the voltage from the amplifying means and the voltage from the phase shift network are in phase, and is substantially zero when the voltage from the amplifying means and the voltage output of the phase shift network are 90 degrees out of phase.

8. In apparatus of the character disclosed, in combination, a bridge circuit; an input transformer having the secondary thereof connected in said bridge circuit and adapted when energized to supply an energizing voltage to the bridge circuit; means for energizing said input transformer by a voltage of predetermined frequency; variable inductance signal generating means adapted to have the inductance thereof varied in response to changes in pressure applied thereto and to generate a signal voltage; a fixed resistor; a capacitor; said fixed resistor, capacitor and variable inductance signal generating means being connected in series in one of the arms of said bridge circuit; said capacitor and variable inductance signal generating means having reactance values which substantially provide a series resonant condition at said predetermined frequency; a second fixed resistor connected in parallel with said capacitor and variable inductance signal generating means; a variable resistor and a variable inductor connected in one of the other arms of said bridge circuit and adapted to be adjusted to balancing positions; a third fixed resistor connected in said other arm; said second and third fixed resistors being adapted to suppress voltages of harmonic frequenciese in said bridge circuit; amplifying means connected to said bridge circuit and adapted to have the output voltage of the bridge applied thereto; and indicating means energized from said amplifying means, said indicating means being calibrated to provide a measurement of the signal voltage generated by said signal generating means.

9. In apparatus of the character disclosed, in combination, a bridge circuit; an input transformer connected in said bridge circuit and adapted when energized to supply a voltage of predetermined frequency to said bridge circuit; a source of alternating current potential of said frequency; means connecting said source of alternating current potential to said input transformer for energizing the bridge; a signal transducer comprising an inductance adapted to be varied in response to changes in pressure applied to the transducer for generating a signal voltage; said signal transducer being connected in one of the arms of said bridge circuit; a capacitor and a resistor connected in series with said signal transducer in said arm; a pair of resistance means connected across a pair of the arms of said bridge circuit respectively and adapted to suppress voltages of harmonic frequencies generated in said bridge circuit; means in another of the arms of said bridge circuit for balancing the bridge in the absence of a signal voltage generated in the bridge by said transducer; said last named means including a variable resistor element, a fixed capacitor element, and a variable inductor element; amplifying means connected to said bridge circuit and adapted to have the output voltage of the bridge applied thereto; rectifying means energized from said amplifying means; and indicating means operatively connected to said rectifying means to be energized therefrom, said indicating means being constructed and arranged to indicate the magnitude of the signal voltage generated by said signal transducer.

10. In apparatus of the character disclosed, in combination, an alternating current bridge circuit, means for energizing the circuit, a signal transducer including a variable inductance element connected in one of the arms of said bridge circuit and adapted to produce a signal voltage in response to changes in pressure applied thereto, means connected to said energizing means for providing an adjustable portion of the voltage generated by the energizing means, means for adjusting the phase of said portion of voltage, means for amplifying said portion of voltage, and means connected to said amplifying means and to said bridge circuit for injecting in one of the arms of the bridge said amplified portion of the voltage thereby to balance said bridge circuit.

11. In apparatus of the character disclosed, in combination, a bridge circuit, an input transformer connected in said bridge circuit and adapted to energize the circuit, alternating current means connected to said transformer for energizing the same, a variable impedance signal generating element connected in one of the arms of said bridge circuit, means connected in another of the arms of said bridge circuit for balancing the bridge in the absence of a signal generated by said generating element, amplifying means connected to said bridge circuit to have the output voltage thereof applied thereto, a demodulator operatively connected to said amplifying means and adapted to have the output voltage of the amplifying means applied thereto, a variable phase shifting network, transformer means connected to said bridge circuit and to said phase shifting network for energizing the network from the circuit, said phase shifting network being operatively connected to said demodulator for supplying the output of the network to the demodulator, indicating means operatively connected to said demodulator, said demodulator being constructed and arranged to provide a voltage to said indicating means which is a function of the phase angle between the output voltage of the amplifying means and the output voltage of the phase shifting network and which is proportional to the output voltage of the amplifying means.

12. In apparatus of the character disclosed, in combination, a bridge circuit including an input transformer, alternating current means for energizing the input transformer, a signal transducer comprising a variable inductor element connected to one of the arms of said bridge circuit, bridge balancing means including a second variable inductor connected in another of the arms of said bridge circuit, an output transformer connected to said bridge circuit and adapted to have the unbalance voltage of the bridge applied thereto, means connected to the output transformer for amplifying the output voltage thereof, means connected to said bridge circuit for obtaining therefrom a voltage substantially in phase with the bridge exciting current, means connected to said last named means for shifting the phase of said last named voltage by a predetermined variable amount, demodulating means connected to said last named means and to said amplifying means and adapted to receive voltages therefrom, said demodulating means being constructed and arranged to provide a demodulated output voltage which is proportional in amplitude to the voltage received from said amplifying means and is a function of the phase angle between the voltage received from said amplifying means and the voltage received from the phase shifting means, and means connected to said demodulating means for indicating the magnitude of the demodulator output voltage, said indicating means being calibrated to provide a measurement of the unbalance voltage of said bridge circuit.

13. In apparatus of the character disclosed, in combination, a bridge circuit including an input transformer adapted to energize the bridge circuit, alternating current means for energizing said input transformer, one of the arms of said bridge circuit including a signal transducer, said signal transducer comprising a variable inductance element adapted to generate a signal voltage in response to changes in pressure applied to the transducer, means in another of the arms of the bridge circuit for balancing the circuit in the absence of a signal voltage from the signal transducer, an output transformer connected to said bridge circuit and adapted to have the unbalance output of the bridge circuit applied thereto, amplifying means connected to said output transformer and adapted to be energized therefrom, a third transformer connected in one of the arms of said bridge circuit, phase shifting means connected to the secondary of said third transformer and adapted to be energized therefrom, additional variable phase shifting means connected to the secondary of said third transformer and adapted to be energized therefrom, an operative connection between said additional phase shifting means and the secondary of said output transformer, voltage adjusting means included in said additional phase shifting means, the voltage output of said additional phase shifting means being applied to said amplifying means by said operative connection in phase and amplitude relationship with the voltage output of said output transformer in accordance with the setting of said additional phase shifting means and said voltage adjusting means, demodulator means connected to said amplifying means and adapted to have the output voltage of the amplifying means applied thereto, said demodulator means also being connected to said phase shifting means and adapted to have the output voltage of the phase shifting means applied thereto concurrently with the output voltage of the amplifying means, and an indicating device operatively connected to said demodulator means, said demodulator means being constructed and arranged to supply a voltage to said indicating device which is proportional to the resultant amplitude of the voltage applied to the demodulator means from the amplifying means and is a function of the phase angle between the last-named voltage and the voltage supplied to the demodulator means from said phase shifting means.

14. In apparatus of the character disclosed, in combination, a bridge circuit including an input transformer, alternating current voltage generating means connected to said input transformer for energizing the same, a transducer element connected in one of the arms of said bridge circuit and adapted to generate a voltage in response to variations in pressure applied thereto, means including a variable resistor and variable inductor connected in one of the other arms of said bridge circuit for balancing the bridge in the absence of a voltage generated by said transducer, means connected to said bridge circuit for obtaining therefrom an unbalance output voltage, output voltage amplifying means connected to said last-named means to be energized therefrom, phase sensitive demodulator means connected to said amplifying means to have a first voltage applied thereto by said amplifying means, variable phase shifting means connecting said phase sensitive demodulator means to said bridge circuit to apply a second voltage thereto, said phase sensitive demodulator means including a plurality of rectifier elements and being constructed and arranged to provide a demodulator output voltage proportional to the output of the amplifying means and which is a function of the phase angle between the two voltages applied to the demodulator means, and indicating means connected to said demodulator means for indicating the magnitude of the demodulator output voltage, said indicating means being calibrated to provide a measurement of the amplitude of the voltage produced by said signal transducer.

15. In apparatus of the character disclosed, in combination, a bridge circuit including a transducer connected in one of the arms thereof, said transducer including a variable reactance element adapted to have the reactance thereof varied in response to variations in pressure applied to the transducer, alternating current means connected to the bridge circuit for energizing the bridge circuit with an alternating current of predetermined frequency, means connected in the bridge circuit for approximately balancing the bridge circuit in the absence of pressure variations applied to said transducer, an output circuit connected to said bridge circuit, means for securing a nulling voltage having the same frequency as the exciting current in said bridge circuit and a predetermined phase relation with respect thereto, and means for adjusting the phase of a variable portion of said nulling voltage and applying said portion to said output circuit thereby to cancel out in said output circuit components of voltage resulting from unbalance of the bridge circuit and simulate precise balance conditions of said bridge circuit.

16. In apparatus of the character disclosed, in combination, a bridge circuit including a transducer connected in one of the arms thereof, said transducer including a variable reactance element adapted to have the reactance thereof varied in response to variations in pressure applied to the transducer, an oscillator circuit adapted to generate an A.-C. voltage of predetermined frequency, means in said oscillator circuit for stabilizing the frequency and amplitude of the oscillations generated in the circuit, operative connections between said oscillator circuit and said bridge circuit for energizing the bridge circuit by the voltage generated in the oscillator circuit, means connected in the bridge circuit for approximately balancing the bridge circuit in the absence of pressure variations applied to said transducer, an output circuit connected to said bridge circuit, means coupled to said bridge circuit for obtaining a nulling voltage having the same frequency as the exciting current in said bridge circuit and a predetermined phase relation with respect thereto, and means for adjusting the phase of a variable portion of said nulling voltage and applying said portion to said output circuit thereby to cancel out in said output circuit components of voltage resulting from unbalance of the bridge circuit and simulate precise bridge balance conditions.

17. In apparatus of the character disclosed, in combination, a bridge circuit including a transducer connected in one of the arms thereof, said transducer including a variable reactance element adapted to have the reactance thereof varied in response to variations in pressure applied to the transducer, an oscillator circuit adapted to generate an A.-C. voltage of predetermined frequency, operative connections between said oscillator circuit and said bridge circuit for energizing the bridge circuit by said A.-C. voltage, means connected in the bridge circuit for approximately balancing the bridge circuit in the absence of pressure variations applied to said transducer, an output circuit connected to said bridge circuit, means coupled to said oscillator circuit for obtaining a nulling voltage having the same frequency as the exciting voltage of said bridge circuit and a predetermined phase relation with respect thereto, means for adjusting the phase of a variable portion of said nulling voltage and applying said portion to said bridge circuit thereby to provide a precise bridge balance condition and cancel out in said bridge circuit components of voltage resulting from unbalance of the bridge circuit.

18. In apparatus of the character disclosed, in combination, a bridge circuit including a transducer connected in one of the arms thereof, said transducer including a variable reactance element adapted to have the reactance thereof varied in response to variations in pressure applied to the transducer, alternating current means including a stabilized oscillator and connected to the bridge circuit for energizing the bridge circuit by a current of predetermined frequency, means including a variable reactance element and a variable resistance element connected in the bridge circuit for approximately balancing the bridge in the absence of pressure variations applied to said transducer, an output circuit including a mixing impedance element and connected to said bridge circuit, means operatively connected to said bridge circuit for securing a nulling voltage having the same frequency as the exciting current in said bridge circuit and a predetermined phase relation with respect thereto, and means for adjusting the phase of a variable portion of said nulling voltage and applying said portion to said mixing impedance element thereby to cancel out in said output circuit components of voltage resulting from unbalance of the bridge circuit and simulate precise bridge balance conditions.

19. In apparatus of the character disclosed, in combination, a bridge circuit including a transducer connected in one of the arms thereof, said transducer including a variable reactance element adapted to have the reactance thereof varied in response to variations in pressure applied to the transducer, an oscillator circuit adapted to generate an A.-C. voltage of predetermined frequency, means in said oscillator circuit for stabilizing the frequency and amplitude of the oscillations generated in the circuit, operative connections including a transformer and connected between said oscillator circuit and said bridge circuit for energizing the bridge circuit by the voltage generated in the oscillator circuit, means including a variable reactance element and a variable resistance element and connected in the bridge circuit for approximately balancing the bridge circuit in the absence of pressure variations applied to said transducer, an output circuit including a mixing impedance element and connected to said bridge circuit, means coupled to said oscillator circuit for obtaining a nulling voltage having the same frequency as the exciting voltage of said bridge circuit and a predetermined phase relation with respect thereto, means for adjusting the phase of a variable portion of said nulling voltage and applying said portion to said mixing impedance element thereby to cancel out in said output circuit components of voltage resulting from unbalance of said bridge circuit and simulate precise bridge balance conditions.

20. In apparatus of the character disclosed, in combination, a bridge circuit including a transducer connected in one of the arms thereof, said transducer including a variable reactance element adapted to have the reactance thereof varied in response to variations in pressure applied to the transducer, alternating current means including an oscillator and connected to the bridge circuit for energizing the bridge circuit at a predetermined alternating current frequency, means connected in the bridge circuit for approximately balancing the bridge in the absence of pressure variations applied to said transducer, an output circuit including a mixing impedance and connected to said bridge circuit, means operatively connected to said bridge circuit for securing a nulling voltage having the same frequency as the exciting current in said bridge circuit and a predetermined phase relation with respect thereto, and means including an R-C network for adjusting the phase of a variable portion of said nulling voltage and applying said portion to said mixing impedance thereby to cancel out in said output circuit the components of voltage resulting from unbalance of said bridge circuit and simulate precise bridge balance conditions.

21. In apparatus of the character disclosed, in combination, a bridge circuit including a transducer connected in one of the arms thereof, said transducer including a variable reactance element adapted to have the reactance thereof varied in response to variations in pressure applied to the transducer, alternating current means including an oscillator and connected to the bridge circuit for energizing the bridge circuit at a predetermined alternating current frequency, means connected in the bridge circuit for approximately balancing the bridge circuit in the absence of pressure variations applied to said transducer, an output circuit including a mixing impedance and connected to said bridge circuit, means operatively connected to said bridge circuit for securing a nulling voltage having the same frequency as the exciting current in said bridge circuit and a predetermined phase relation with respect thereto, means including an R-C network for adjusting the phase of a variable portion of said nulling voltage and applying said portion to said mixing impedance thereby to cancel out in said output circuit components of voltage resulting from unbalance of said bridge circuit and simulate precise bridge balance conditions, and indicating means operatively connected to said bridge circuit and constructed and arranged to indicate the magnitude of an unbalance component of voltage of said bridge circuit.

22. In apparatus of the character disclosed, in combination, a bridge circuit including a transducer connected in one of the arms thereof, said transducer including a variable reactance element adapted to have the reactance thereof varied in response to variations in pressure applied to the transducer, alternating current means including an oscillator and connected to the bridge circuit for energizing the bridge circuit at a predetermined alternating current frequency, selective means operatively connected to said bridge circuit for obtaining therefrom a voltage which is selectively representative of the reactive and resistive components of unbalance voltage in the bridge, means for indicating the magnitude of the last named voltage, and means connected in the bridge circuit for balancing the bridge in the absence of a varying pressure applied to said transducer.

23. In apparatus of the character disclosed, in combination, a bridge circuit including a transducer connected in one of the arms thereof, said transducer including a variable reactance element adapted to have the reactance thereof varied in response to variations in pressures applied to the transducer, means for energizing said bridge circuit with an alternating current of predetermined frequency, means for obtaining from said energizing means a nulling voltage of adjustable phase and amplitude, means for applying said last named voltage to said bridge circuit thereby to cancel out components of voltage resulting from unbalance of the bridge circuit, and means operatively connected to the bridge circuit for indicating the degree of unbalance thereof.

24. Electrical bridge measuring apparatus of the character disclosed comprising, in combination, a bridge circuit, means for energizing the circuit, a variable reactance signal transducer connected in one of the arms of the bridge circuit and adapted to have the reactance thereof varied in response to variations in pressure applied thereto, means connected in the bridge circuit for approximately balancing the bridge circuit in the absence of a varying pressure applied to said transducer, an output circuit for said bridge circuit, means connected to the bridge circuit for obtaining therefrom a voltage of adjustable amplitude and phase with respect to the exciting current in said bridge circuit, means for applying said last named voltage to said output circuit in a manner to cancel out components of voltage in the output circuit resulting from unbalance of the bridge circuit, means connected to said output circuit for obtaining a first voltage therefrom, means connected to said bridge circuit for securing therefrom a second voltage of adjustable phase and amplitude, demodulator means adapted to have said first and second voltages applied thereto and to supply a demodulator output voltage which is proportional to said first voltage and is a function of the phase angle between said first and second voltages, and indicating means operatively connected to said demodulator means and adapted to indicate the magnitude of the demodulator output voltage.

25. Electrical bridge measuring apparatus of the character disclosed comprising, in combination, a bridge circuit, means for energizing the bridge circuit by an A.-C. voltage of predetermined frequency, a variable reactance signal transducer connected in one of the arms of the bridge circuit and adapted to have the reactance thereof varied in response to variations in pressure applied thereto, means connected in the bridge circuit for approximately balancing the bridge circuit in the absence of a varying pressure applied to said transducer, an output circuit for said bridge circuit, means for obtaining a voltage at said frequency and of adjustable amplitude and phase with respect to the exciting current in said bridge circuit, means for applying said last named voltage to said output circuit in a manner to cancel out components of voltage in the output circuit resulting from unbalance of the bridge circuit, means connected to said output circuit for obtaining a first voltage therefrom, means for obtaining a second voltage of said predetermined frequency and of adjustable phase and amplitude, demodulator means adapted to have said first and second voltages applied thereto and to supply a demodulator output voltage which is proportional to said first voltage and is a function of the phase angle between said first and second voltages, and indicating means operatively connected to said demodulator means and adapted to indicate the magnitude of the demodulator output voltage.

26. Electrical bridge measuring apparatus of the character disclosed comprising, in combination, a bridge circuit, means for energizing the bridge circuit by an A.-C. voltage of predetermined frequency, a variable reactance signal transducer connected in one of the arms of the bridge circuit and adapted to have the reactance thereof varied in response to variations in pressure applied thereto, means connected in the bridge circuit for approximately balancing the bridge circuit in the absence of a varying pressure applied to said transducer, an output circuit for said bridge circuit, means for obtaining from said energizing means a voltage of adjustable amplitude and phase and applying said last named voltage to said bridge circuit in a manner to precisely balance the bridge, means connected to said output circuit for obtaining a first voltage therefrom, means connected to said bridge circuit for obtaining therefrom a second voltage of adjustable phase and amplitude, demodulator means adapted to have said first and second voltages applied thereto and to supply a demodulator output which is proportional to said first voltage and is a function of the phase angle between said first and second voltages, and indicating means operatively connected to said demodulator means and adapted to indicate the magnitude of the demodulator output voltage.

27. In electrical bridge circuit measuring apparatus of the character disclosed having a bridge output circuit and employing means for obtaining a voltage of adjustable phase and amplitude and applying this voltage to the output circuit to cancel out components resulting from bridge unbalance and simulate precise balance conditions in said bridge, in combination; a mixing impedance connected in said output circuit; a transformer having the primary thereof connected in said bridge circuit; and a phase shifting network connected across the secondary of said transformer to be energized therefrom, said phase shifting network including first and second potentiometers having movable arms individual thereto, said potentiometers being connected across said secondary, a resistor connected to the movable arm of said first potentiometer, a capacitor connected to the movable arm of said second potentiometer, an electron discharge tube having an anode and a control grid, said resistor and capacitor being operatively connected to said control grid, said anode being operatively connected to said mixing impedance, said first and second potentiometers providing adjustment of the phase and magnitude of the voltage applied to said control grid and to said mixing impedance.

28. In electrical bridge circuit measuring apparatus of the character disclosed having energizing means connected to the bridge circuit and employing means for obtaining from the energizing means a voltage of adjustable phase and amplitude and applying this voltage to the bridge circuit to cancel out signal components therein resulting from unbalance and simulate balance conditions in the bridge circuit, in combination; a pair of series connected substantially equal fixed resistors operatively connected between the energizing means and the bridge circuit, the junction between said pair of fixed resistors being connected to ground, a pair of variable resistors having movable arms and connected to the remote ends of said pair of fixed resistors respectively, a capacitor, a potentiometer having a movable arm, said capacitor and potentiometer being connected in parallel and between the movable arms of said variable resistors, an electron discharge tube having an anode, control grid, and cathode, the movable arm of said potentiometer being connected to said control grid, said cathode being connected to ground, a transformer having a primary and a secondary, said secondary being connected in said bridge circuit, said anode being electrically connected to one end of said primary, the other end of said primary being connected to a source of anode potential, said variable resistors and said potentiometer being constructed and arranged for adjusting the phase and amplitude of the voltage applied to said primary.

29. In apparatus of the character disclosed, in combination, a bridge circuit, means for energizing the bridge circuit, a variable reactance signal transducer connected in one of the arms of the bridge circuit, said transducer being adapted to have the reactance thereof periodically varied in response to variations in pressure applied thereto, means for balancing the bridge, a normally shorted known reactance connected in another of the arms of the bridge circuit, an output circuit for said bridge circuit, indicating means operatively connected to said output circuit and constructed and arranged to provide an indication of the unbalance voltage in said bridge circuit, said transducer being calibrated in terms of change in inductance per unit pressure applied thereto, and means for unshorting said known reactance, the indication on said indicating means when the bridge is balanced and the known reactance thereafter unshorted providing means for ascertaining and calibrating the gain and sensitivity of the apparatus.

References Cited in the file of this patent
UNITED STATES PATENTS

| | | |
|---|---|---|
| 1,606,791 | Horton | Nov. 16, 1926 |
| 1,950,406 | Hoorn | Mar. 13, 1934 |
| 2,015,674 | Hayes | Oct. 1, 1935 |
| 2,063,125 | Rust | Dec. 8, 1936 |
| 2,338,732 | Nosker | Jan. 11, 1944 |